(No Model.) 2 Sheets—Sheet 1.
G. WESTINGHOUSE, Jr., & F. MOORE.
PRESSURE REGULATOR AND CUT-OFF.
No. 352,382. Patented Nov. 9, 1886.
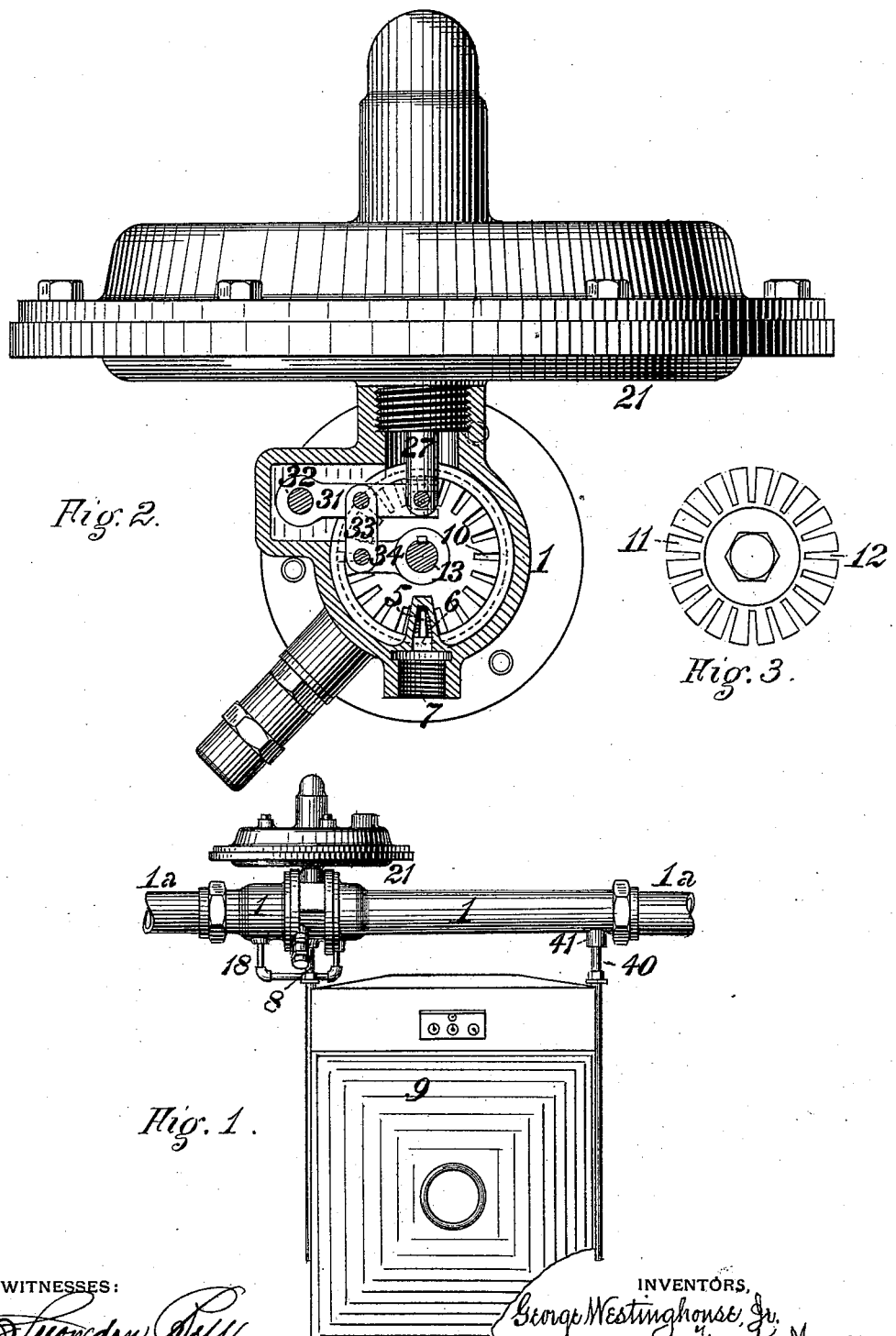
WITNESSES: INVENTORS, (No Model.)  2 Sheets—Sheet 2.

G. WESTINGHOUSE, Jr., & F. MOORE.
PRESSURE REGULATOR AND CUT-OFF.

No. 352,382.  Patented Nov. 9, 1886.

WITNESSES:
Snowden Bell
C. M. Clarke

INVENTORS
George Westinghouse, Jr.
Frank Moore,
George H. Christy Att'y.

N. PETERS, Photo-Lithographer, Washington, D. C.

UNITED STATES PATENT OFFICE.

GEORGE WESTINGHOUSE, JR., AND FRANK MOORE, OF PITTSBURG, PA.

PRESSURE REGULATOR AND CUT-OFF.

SPECIFICATION forming part of Letters Patent No. 352,382, dated November 9, 1886.

Application filed August 12, 1886. Serial No. 210,714. (No model.)

*To all whom it may concern:*

Be it known that we, GEORGE WESTINGHOUSE, Jr., and FRANK MOORE, both residing at Pittsburg, in the county of Allegheny and State of Pennsylvania, and both citizens of the United States, have jointly invented or discovered certain new and useful Improvements in Pressure Regulators and Cut-Offs, of which improvements the following is a specification.

Figure 4:
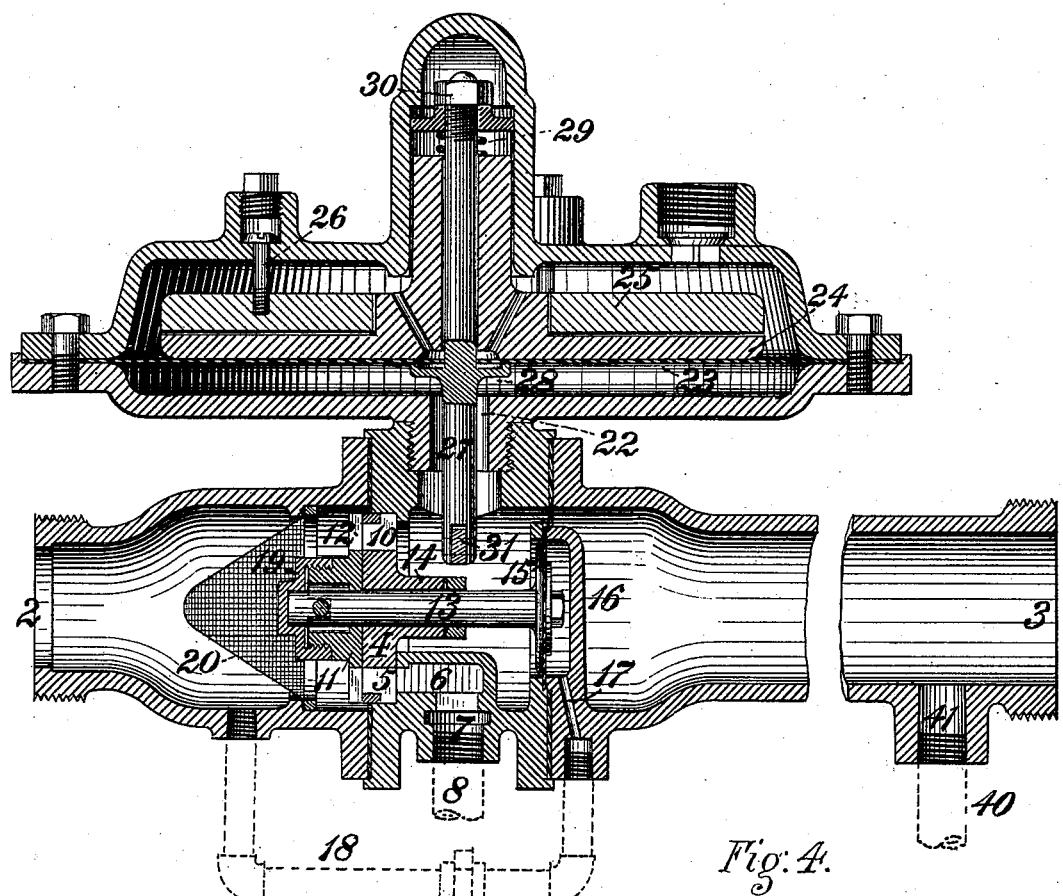
Figure 5:
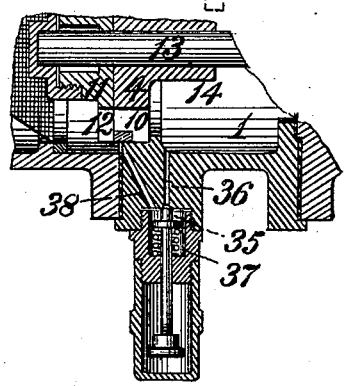

In the accompanying drawings, which make part of this specification, Figure 1 is a side view in elevation of a pressure regulator and cut-off embodying our invention; Fig. 2, a transverse section, on an enlarged scale, through the same, looking to the left, at the line $x$ $x$ of Fig. 4; Fig. 3, a view in elevation of the regulating-valve detached; Fig. 4, a longitudinal central section through the regulator and cut-off, and Fig. 5 a similar section through the by-pass valve.

Our invention is an improvement upon that for which Letters Patent of the United States No. 341,295 were granted and issued to George Westinghouse, Jr., under date of May 4, 1886, and its object is to provide effective and desirable means for regulating and maintaining uniform pressure in service-pipes, shutting off supply upon the pressure falling below a determined limit, and affording proper volume of supply to a proportional meter.

To this end our invention, generally stated, consists in the combination of a chamber or casing, a rotary valve governing a series of ports therein, and a weighted pressure plate or diaphragm working in a chamber communicating with the valve-casing and having its stem coupled to that of the valve; also, in means for reducing friction upon the valve and preventing access of foreign matters thereto. The improvements claimed are hereinafter fully set forth.

Our invention being particularly designed for application in the system of measurement of gas, in which a determined fraction only of the supply is passed through the measuring device, the capacity and cost of which is thereby correspondingly reduced, will be herein described in connection with a proportional meter; but it will be obvious to those skilled in the art that, if desired, the functions of regulating and cutting-off supply which it is adapted to perform may be effected independently of the measurement of supply volume and irrespective of the description of meter, if any, employed.

In the practice of our invention we provide a chamber or casing, 1, having at its opposite ends supply and delivery openings or nozzles 2 3, suitably adapted to be connected, as by bolt-flanges or screw-threads, to a service-pipe, 1ª, leading from a gas-main or other source of supply to a series of burners or other point of utilization or consumption. A valve seat or partition, 4, having a series of radial ports or openings at and adjacent to its periphery, is secured transversely in the casing 1, between its supply and delivery openings, communication from the former to the latter being practicable only through the ports of the valve-face.

Where, as in the present instance, the apparatus is designed for use in connection with a proportional meter, one of the ports 5 of the valve-seat serves as a meter-port and communicates directly with a channel or passage, 6, leading from the delivery side of the valve-seat 4 to a nozzle or opening, 7, adapted to receive a meter-supply pipe, 8, by which communication is established between the meter-port 5 and the supply side of a proportional meter, 9, of any suitable and preferred construction, from the delivery side of which a pipe, 40, leads to an opening or nozzle, 41, in the casing 1, between its delivery end and the valve-seat 4. The remaining ports, 10, of the valve-face establish communication directly between the supply and delivery ends of the casing 1, and act, therefore, as direct delivery-ports.

A regulating and cut-off valve, 11, which is in the form of a circular plate or disk having a series of radial ports or openings, 12, at and adjacent to its periphery, corresponding in form, number, and relative position with the ports of the valve-seat 4, is fixed upon a valve-stem, 13, which is fitted to move freely about its axis in a central bearing, 14, in the valve-seat, the valve 11 being faced off truly on one of its sides, which abuts against the supply side of the valve-face and acting to simultaneously open or close, either entirely or to a greater or less degree, the ports therein, in accordance with the axial movements of its stem 13.

In order to facilitate the movement of the valve and prevent undue friction between its face and that of the valve-seat under heavy pressures of gas or sudden accessions of pressure, a flexible balancing diaphragm, 15, is secured centrally to the delivery end of the valve-stem 13 and peripherally to the wall of an equilibrium-chamber, 16, which extends partially across the casing 1 and communicates by a port or passage, 17, with a pipe, 18, leading to the supply side of the valve-seat. Equilibrium of pressure on opposite sides of the valve being thus established, its movements are effected with corresponding freedom and facility. A cap-nut, 19, which is secured upon the valve, covers the supply end of the valve-stem and prevents leakage of gas between the same and the valve, and access of dirt and other foreign matter to the valve is prevented by a dished or conical strainer, 20, of perforated metal or wire-netting extending across the casing 1 on the supply side of the valve.

Axial movement is imparted to the valve-stem 13 and connected valve 11, to effect the regulation or entire closure, as the case may be, of the ports of the valve-seat 4 by a movable abutment or pressure-plate working in a pressure-chamber, 21, which communicates by a passage, 22, with the valve-casing 1 on the delivery side of the valve-seat 4. In the instance shown we employ a flexible diaphragm, 23, which extends across the pressure-chamber 21, and is secured at its periphery between the upper and lower sections thereof, downward pressure being exerted upon it by a pair of weights, 24 25, which bear upon its upper surface. The diaphragm is constantly subject to the gravity of the lower or main weight, 24, but is relieved from that of the upper or supplemental weight, 25, upon a determined material reduction of pressure by the contact of stops formed by the heads of vertical bolts 26 in the weight 25 with the upper shell of the pressure-chamber upon the lowering of the weight to a level corresponding with such reduction of pressure.

A vertical stem, 27, having a collar, 28, which bears against the lower side of the diaphragm, passes freely through the center of the diaphragm and weights, and a spring, 29, bears at one end against a head or stop, 30, on the stem 27, and at the other against the upper or supplemental weight, 25. The pressure-chamber and its accessories are substantially similar in construction and mode of operation with the corresponding parts in Patent No. 341,295 aforesaid, and are not of themselves herein claimed.

The stem 27 of the diaphragm is pivoted at its lower end to a lower arm, 31, journaled on a shaft, 32, fixed in the casing 1, and the arm 31 is coupled by a link, 33, between its bearing and the stem 27, to an arm, 34, fixed on the valve-stem 13, the effect of such construction being to reduce the axial movement of the valve-stem 13 and valve 11 relatively to the vertical traverse of the diaphragm proportionately to the difference of distances between the center of the shaft 32 and stem 27, and between the center of said shaft and that of the pin coupling the link 33 to the lever-arm 31.

Pressure is admitted to the chamber 21 to effect the elevation of the diaphragm and consequent opening of the ports in the valve-seat after the supply of gas has been entirely cut off by the valve upon the diminution of pressure below a determined limit by a hand operated by pass-valve 35, governing a passage, 36, leading from a chamber, 37, into the casing 1 on the delivery side of the valve-seat 4, gas being admitted to the chamber 37 through a passage, 38, on the supply side of the valve-seat.

In operation, the vertical movements of the weighted pressure-plate or diaphragm induced by variations of supply-pressure will correspondingly move the valve 4, and. thereby increasing or diminishing in proper proportion the flow of gas through the meter-port and direct delivery-ports of the valve seat, will maintain the required regulation of pressure and proportionate supply to the meter. Upon reduction of pressure below a determined limit or entire cessation of supply the further downward movement of the diaphragm and continued axial movement of the valve will completely close the ports and shut off the supply of gas to the delivery of the service-pipe and to the meter.

We claim herein as our invention—

1. In a pressure-regulating apparatus, the combination of a chamber or casing having supply and delivery passages at opposite ends, a transverse valve seat or partition located in the casing between said passages, a rotary valve fixed upon a stem passing through said valve-seat and governing a series of ports or openings therein, and a weighted pressure-plate or diaphragm working in a pressure-chamber communicating with the casing on the delivery side of the valve-seat and having its stem coupled to the stem of the valve, substantially as set forth.

2. In a pressure-regulating apparatus, the combination of a chamber or casing having supply and delivery passages at opposite ends, a transverse valve-seat or partition located in the casing between said passages, and having a series of direct delivery-ports and a meter-port communicating with a meter-supply passage, a rotary valve fixed upon a stem passing through said valve-seat and governing said direct delivery-ports and meter-port, a weighted pressure-plate or diaphragm working in a pressure-chamber communicating with the casing on the delivery side of the valve-seat only, and having its stem coupled to the stem of the valve, and a gas-meter adapted to receive a supply of gas from the meter-port and meter-supply passage and to deliver the same to a passage communicating with the discharge end of the casing, substantially as set forth.

3. The combination of a chamber or casing having supply and delivery passages at opposite ends, a transverse-valve seat or partition located in the casing between said passages, a rotary valve fixed upon a stem passing through said valve-seat and governing a series of ports or openings therein, a weighted diaphragm or pressure plate having its stem coupled to the stem of the valve, and a balancing-diaphragm or pressure-plate fixed upon the valve-stem on the delivery side of the valve and working in an equilibrium-chamber communicating with the casing on the supply side of the valve, substantially as set forth.

4. The combination of a chamber or casing having supply and delivery passages at opposite ends, a transverse valve-seat or partition located in the casing between said passage, a rotary valve fixed upon a stem passing through said valve-seat and governing a series of ports or openings therein, a weighted diaphragm or pressure-plate having its stem coupled to the valve-stem, and a grated or perforated strainer extending across the casing between the valve and the supply-passage of the casing, substantially as set forth.

5. The combination of a chamber or casing having supply and delivery passages at opposite ends, a transverse valve-seat or partition having a series of radial ports at or near its periphery and a central socket or bearing, and fixed in the casing between the supply and delivery passages, a plate or disk-valve having a series of radial ports adapted to register with the ports of the valve-seat and fixed upon a stem fitting freely in the central bearing thereof, a weighted diaphragm or pressure-plate working in a pressure-chamber which communicates with the casing on the delivery side of the valve-seat only, and a lever-and-link connection coupling the stem of the diaphragm to the valve-stem, substantially as set forth.

In testimony whereof we have hereunto set our hands.

GEO. WESTINGHOUSE, Jr.
FRANK MOORE.

Witnesses:
J. SNOWDEN BELL,
R. H. WHITTLESEY.